(12) United States Patent
Hayashi et al.

(10) Patent No.: US 8,346,916 B2
(45) Date of Patent: Jan. 1, 2013

(54) INFORMATION PROCESSING APPARATUS, CONTROL METHOD OF INFORMATION PROCESSING APPARATUS, AND STORAGE MEDIUM OF STORING COMPUTER PROGRAM TO PERFORM CONTROL METHOD

(75) Inventors: Tomonori Hayashi, Kawasaki (JP); Tadahiro Nakamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 226 days.

(21) Appl. No.: 12/470,093

(22) Filed: May 21, 2009

(65) Prior Publication Data
US 2009/0300175 A1 Dec. 3, 2009

(30) Foreign Application Priority Data
May 29, 2008 (JP) .................................. 2008-141056

(51) Int. Cl.
G06F 15/173 (2006.01)
(52) U.S. Cl. ........................................ 709/224; 709/223
(58) Field of Classification Search .................. 709/224, 709/223
See application file for complete search history.

(56) References Cited

U.S. PATENT DOCUMENTS

| | | | | |
|---|---|---|---|---|
| 6,161,144 A * | 12/2000 | Michels et al. | ............... | 709/238 |
| 6,570,877 B1 * | 5/2003 | Kloth et al. | ............... | 370/392 |
| 6,996,611 B1 * | 2/2006 | Muto | ............... | 709/223 |
| 7,099,937 B1 * | 8/2006 | Ochiai et al. | ............... | 709/224 |
| 7,614,076 B2 * | 11/2009 | Ono et al. | ............... | 725/142 |
| 7,664,837 B2 * | 2/2010 | Ohara | ............... | 709/223 |
| 7,743,144 B1 * | 6/2010 | Wright et al. | ............... | 709/225 |
| 7,849,055 B2 * | 12/2010 | Banerjee et al. | ............... | 707/609 |
| 8,169,641 B2 | 5/2012 | Kudo | | |
| 2002/0099773 A1 * | 7/2002 | Tsuru | ............... | 709/204 |
| 2002/0156947 A1 | 10/2002 | Nishio | ............... | 710/36 |
| 2003/0054821 A1 * | 3/2003 | Kita et al. | ............... | 455/435 |
| 2003/0088544 A1 * | 5/2003 | Kan et al. | ............... | 707/3 |
| 2003/0097425 A1 * | 5/2003 | Chen | ............... | 709/220 |
| 2004/0111494 A1 * | 6/2004 | Kostic et al. | ............... | 709/220 |
| 2004/0243572 A1 * | 12/2004 | Muto | ............... | 707/3 |
| 2005/0149509 A1 * | 7/2005 | Kobayashi et al. | ............... | 707/3 |
| 2006/0039373 A1 * | 2/2006 | Nakamura et al. | ............... | 370/389 |
| 2007/0216960 A1 * | 9/2007 | Ohtani | ............... | 358/407 |
| 2008/0140646 A1 * | 6/2008 | Inoue et al. | ............... | 707/5 |
| 2008/0155563 A1 | 6/2008 | Nakamura | | |
| 2008/0198762 A1 * | 8/2008 | Bai et al. | ............... | 370/254 |

FOREIGN PATENT DOCUMENTS

| | | | |
|---|---|---|---|
| JP | 2001-028004 A | | 1/2001 |
| JP | 2003-006133 | | 1/2003 |
| JP | 2004-062443 A | | 2/2004 |
| JP | 2007-097057 A | | 4/2007 |

OTHER PUBLICATIONS

Office Action issued on Oct. 16, 2012, in counterpart Japanese application No. 2008-141056.

* cited by examiner

*Primary Examiner* — David Lazaro
*Assistant Examiner* — Waseem Ashraf
(74) *Attorney, Agent, or Firm* — Fitzpatrick, Cella, Harper & Scinto

(57) ABSTRACT

In a search server, a search request for searching for a device is received from a client PC, the device satisfying a search condition included in the received search request is searched for, and a searched result is transmitted to the client PC. Further, it is judged whether or not an apparatus at a transfer destination to which the search request is transferred has been registered in the search server. If it is judged that the apparatus at the transfer destination has been registered in the search server, the search request is transferred to the registered apparatus at the transfer destination based on the received search request.

6 Claims, 17 Drawing Sheets

FIG. 6

| ID | UUID | VERSION | DEVICE TYPE | MODEL NAME | DEVICE NAME | URL |
|---|---|---|---|---|---|---|
| 1 | 123456 | 1 | Printer | LBPXXXX | Dev Printer | http://192.168.0.1/wsd/mex |
| 2 | 987654 | 1 | Printer | LBPYYYY | Sales Printer | http://192.168.0.2/wsd/mex |

FIG. 7

```
<Envelope>
   <Header>
      <Action>Hello</Action>
      <MessageID>1</MessageID>           } 701
      <To>urn:discovery</To>
   </Header>
   <Body>
      <Hello>
         <EndpointReference>
            <Address>urn:uuid:123456</Address>
         </EndpointReference>
         <Types>MFP</Types>              } 702
         <XAddrs>http://192.168.0.1/wsd/mex</XAddrs>
         <MetadataVersion>1</MetadataVersion>
      </Hello>
   </Body>
</Envelope>
```

FIG. 8

```
<Envelope>
   <Header>
         <Action>Get</Action>
         <MessageID>1</MessageID>
         <To>urn:uuid:123456</To>
   </Header>
   <Body/>
</Envelope>
```

FIG. 9

```
<Envelope>
  <Header>
    <Action>GetResponse</Action>
    <MessageID>1</MessageID>
    <To>anonymous</To>
  </Header>
  <Body>
    <Metadata>
      <MetadataSection>
        <ThisDevice>
          <FriendlyName>DevPrinter</FriendlyName>          } 901
          <FirmwareVersion>1.00</FirmwareVersion>
          <SerialNumber>1111</SerialNumber>
        </ThisDevice>
      </MetadataSection>
      <MetadataSection>
        <ThisModel>
          <Manufacturer>xxx</Manufacturer>
          <ManufacturerUrl>http://www.xxx.com</ManufacturerUrl>   } 902
          <PresentationUrl>http://192.168.0.1</PresentationUrl>
          <ModelName>LBPXXXX</ModelName>
        </ThisModel>
      </MetadataSection>
      <MetadataSection>
        <Relationship>
          <Hosted>
            <EndpointReference>
              <Address>http://192.168.0.1/wsd/print</Address>
            </EndpointReference>                                  } 903
            <Types>PrinterServiceType</Types>
            <ServiceId>uri:123456</ServiceId>
          </Hosted>
        </Relationship>
      </MetadataSection>
    </Metadata>
  </Body>
</Envelope>
```

FIG. 10

```
<Envelope>
    <Header>
        <Action>Bye</Action>
        <MessageID>1</MessageID>
        <To>urn:discovery</To>
    </Header>
    <Body>
        <Bye>
            <EndpointReference>
                <Address>urn:uuid:123456</Address>
            </EndpointReference>
        </Bye>
    </Body>
</Envelope>
```

FIG. 11

```
<Envelope>
    <Header>
        <Action>Probe</Action>
        <MessageID>1</MessageID>
        <To>urn:discovery</To>
    </Header>
    <Body>
        <Probe/>
    </Body>
</Envelope>
```

FIG. 12

```
<Envelope>
  <Header>
    <Action>ProbeMatch</Action>
    <MessageID>1</MessageID>
    <To>anonymous</To>
  </Header>
  <Body>
    <ProbeMatches>
      <ProbeMatch>
        <EndpointReference>
          <Address>urn:uuid:123456</Address>
        </EndpointReference>
        <Types>Printer</Types>
        <XAddrs>http://192.168.0.1/wsd/mex</XAddrs>
        <MetadataVersion>1</MetadataVersion>
      </ProbeMatch>
    </ProbeMatches>
  </Body>
</Envelope>
```

FIG. 13

| | TYPE | MODEL | DEVICE NAME |
|---|---|---|---|
| | Printer | LBPXXXX | Dev Printer |
| | Printer | LBPYYYY | Sales Printer |

DEVICE SEARCH — 1301 (input), 1302 PERFORM SEARCH, 1303 list

FIG. 14

```
<Envelope>
   <Header>
      <Action>Probe</Action>
      <MessageID>1</MessageID>
      <To>urn:discovery</To>
   </Header>
   <Body>
      <Probe>
         <Types>Printer</Types>
      </Probe>
   </Body>
</Envelope>
```

*FIG. 15*

```
<Envelope>
  <Header>
    <Action>ProbeMatch</Action>
    <MessageID>1</MessageID>
    <To>anonymous</To>
  </Header>
  <Body>
    <ProbeMatches>
      <ProbeMatch>
        <EndpointReference>
          <Address>urn:uuid:123456</Address>
        </EndpointReference>
        <Types>Printer</Types>
        <XAddrs>http://192.168.0.1/wsd/mex</XAddrs>
        <MetadataVersion>1</MetadataVersion>
      </ProbeMatch>                                        } 1501
      <ProbeMatch>
        <EndpointReference>
          <Address>urn:uuid:987654</Address>
        </EndpointReference>
        <Types>Printer</Types>
        <XAddrs>http://192.168.0.2/wsd/mex</XAddrs>
        <MetadataVersion>1</MetadataVersion>
      </ProbeMatch>                                        } 1502
    </ProbeMatches>
  </Body>
</Envelope>
```

*FIG. 16*

```
<Envelope>
   <Header>
      <Action>Probe</Action>
      <MessageID>1</MessageID>
      <To>urn:discovery</To>
      <ReplyTo>192.168.0.100</ReplyTo>
   </Header>
   <Body>
      <Probe>
         <Types>Printer</Types>
      </Probe>
   </Body>
</Envelope>
```

FIG. 18

```
<Envelope>
   <Header>
      <Action>Probe</Action>
      <MessageID>1</MessageID>
      <To>urn:discovery</To>
      <Conditions>UpperLayer</Conditions>
   </Header>
   <Body>
      <Probe>
         <Types>Printer</Types>
      </Probe> .
   </Body>
</Envelope>
```

FIG. 19

```
<Envelope>
   <Header>
      <Action>Probe</Action>
      <MessageID>1</MessageID>
      <To>urn:discovery</To>
      <Ttl>1</Ttl>
   </Header>
   <Body>
      <Probe>
         <Types>Printer</Types>
      </Probe>
   </Body>
</Envelope>
```

FIG. 20

```
<Envelope>
    <Header>
        <Action>Probe</Action>
        <MessageID>1</MessageID>
        <To>urn:discovery</To>
        <ReplyTo>192.168.0.100</ReplyTo>
        <Ttl>0</Ttl>
    </Header>
    <Body>
        <Probe>
            <Types>Printer</Types>
        </Probe>
    </Body>
</Envelope>
```

FIG. 22

```
<Envelope>
   <Header>
      <Action>Probe</Action>
      <MessageID>1</MessageID>
      <To>urn:discovery</To>
      <ReplyTo>192.168.0.100</ReplyTo>
      <DpList>192.168.0.10, 192.168.1.10</DpList>
   </Header>
   <Body>
      <Probe>
         <Types>Printer</Types>
      </Probe>
   </Body>
</Envelope>
```

INFORMATION PROCESSING APPARATUS, CONTROL METHOD OF INFORMATION PROCESSING APPARATUS, AND STORAGE MEDIUM OF STORING COMPUTER PROGRAM TO PERFORM CONTROL METHOD

BACKGROUND OF THE INVENTION

1. Field of the Invention

The present invention relates to an information processing apparatus which searches for a device, a control method of the information processing apparatus, and a computer-readable storage medium which stores a computer program to be used to perform the control method.

2. Description of the Related Art

Conventionally, each client such as a personal computer or the like which is connected on a network can search for and use a device such as a printer or the like which is also connected on the network. Here, as a search method of searching for the device, there is a method in which the client transmits search request data by multicast and then receives from each device a reply concerning a search request indicated by the transmitted search request data. Also, there is a method in which a search server (Discovery Proxy, called a DP hereinafter) which holds the information of each device is provided on the network and the client receives the necessary information as a searched result from the DP.

Ordinarily, the network which is constructed by a LAN (local area network) or the like consists of plural subnets, and the respective subnets are mutually connected through a router. Under the circumstances, the router often inhibits data transmitted by broadcast or multicast from one subnet to the other subnet from passing through the router as it is. In this case, the search request data transmitted by broadcast or multicast from the client is therefore sent only within the subnet in which the relevant client exists. Therefore, according to the above search method, the client can resultingly search for only the device which exists in the subnet in which the own apparatus of this client exists.

To solve such a problem, the following method which enables a user of a subnet to search for a device which exists in another subnet has been proposed (for example, Japanese Patent Application Laid-Open No. 2003-006133).

In this method, a server apparatus which acquires device information from the device is provided. More specifically, the server apparatus acquires the device information from the device which exists in another subnet which is different from the subnet in which the own apparatus exists (hereinafter, this "another subnet" is called "different subnet"), and thus a client acquires, from the server apparatus, the information of the device which exists in the different subnet.

According to this method, the client can acquire not only the information of the device which exists in the subnet in which the own apparatus of the client exists but also the information of the device which exists in the different subnet.

However, in the above-described background art, since the server apparatus has to manage not only the information of the device which exists in the subnet in which the server apparatus itself exists but also the information of the device which exists in the different subnet, a load for the server apparatus increases. On the other hand, in order to distribute the load of the server apparatus, it is conceivable to prepare plural server apparatuses and set up one of these server apparatuses to each subnet. In such a method, the server apparatus which has been set up to each subnet manages only the information of the device which exists in the subnet in which the relevant server apparatus exists. In this context, to search for the device which exists in the different subnet which is different from the subnet in which the own apparatus of the client exists, the relevant client transmits a search request to the server apparatus which has been set up to the different subnet. However, in this case, if the client transmits the search request by multicast, the relevant search request is not resultingly transmitted to the different subnet as described above. Therefore, the client has to transmit, by unicast, the search request to the relevant server apparatus which has been set up to the different subnet. For this reason, since the client has to know the address of the relevant server apparatus, it is necessary for the client to previously register the relevant address.

In general, since many clients as compared with server apparatuses are connected to each subnet, it is complicated for the user to register the addresses of the server apparatuses with respect to each of these clients.

SUMMARY OF THE INVENTION

The present invention aims to solve such a conventional problem as described above, and to enable, in a network system which has plural subnets respectively connected through a router, a client of a subnet to more efficiently search for a device which exists in another subnet.

According to a first aspect of the present invention, there is provided an information processing apparatus comprising: a reception unit adapted to receive a search request for searching for a device, from another information processing apparatus; a search unit adapted to search for the device satisfying a search condition included in the search request received by the reception unit; a transmission unit adapted to transmit a searched result including information of the device searched by the search unit, to the another information processing apparatus; a judgment unit adapted to judge whether or not an apparatus at a transfer destination to which the search request is transferred has been registered in the information processing apparatus; and a transfer unit adapted to, in a case where it is judged by the judgment unit that the apparatus at the transfer destination has been registered in the information processing apparatus, transfer the search request to the registered apparatus at the transfer destination based on the search request received by the reception unit.

According to a second aspect of the present invention, there is provided a control method for an information processing apparatus, the control method comprising: receiving a search request for searching for a device, from another information processing apparatus; searching for the device satisfying a search condition included in the search request received; transmitting a searched result including information of the device searched, to the another information processing apparatus; judging whether or not an apparatus at a transfer destination to which the search request is transferred has been registered in the information processing apparatus; and transferring, in a case where it is judged that the apparatus at the transfer destination has been registered in the information processing apparatus, the search request to the registered apparatus at the transfer destination based on the search request received.

According to a third aspect of the present invention, there is provided a computer-readable storage medium storing a computer program for causing an information processing apparatus to execute the following steps of: receiving a search request for searching for a device, from another information processing apparatus; searching for the device satisfying a search condition included in the search request received;

transmitting a searched result including information of the device searched, to the another information processing apparatus; judging whether or not an apparatus at a transfer destination to which the search request is transferred has been registered in the information processing apparatus; and transferring, in a case where it is judged that the apparatus at the transfer destination has been registered in the information processing apparatus, the search request to the registered apparatus at the transfer destination based on the search request received.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate the exemplary embodiments of the present invention and, together with the description, serve to explain the principles of the present invention.

FIG. 6 is a diagram illustrating an example of device information to be held by a device information holding unit according to the embodiment of the present invention.

FIG. 7 is a diagram illustrating an example of a Hello message according to the embodiment of the present invention.

FIG. 8 is a diagram illustrating an example of a Get message according to the embodiment of the present invention.

FIG. 9 is a diagram illustrating an example of a Get Response message according to the embodiment of the present invention.

FIG. 10 is a diagram illustrating an example of a Bye message according to the embodiment of the present invention.

FIG. 11 is a diagram illustrating an example of a Probe message according to the embodiment of the present invention.

FIG. 12 is a diagram illustrating an example of a Probe Match message according to the embodiment of the present invention.

FIG. 13 is a diagram illustrating an example of a UI (user interface) in a case where the client PC searches for the image forming apparatus, according to the embodiment of the present invention.

FIG. 14 is a diagram illustrating an example of the Probe message according to the embodiment of the present invention.

FIG. 15 is a diagram illustrating an example of the Probe Match message according to the embodiment of the present invention.

FIG. 16 is a diagram illustrating an example of the Probe message according to the embodiment of the present invention.

FIG. 18 is a diagram illustrating an example of the Probe message according to the embodiment of the present invention.

FIG. 19 is a diagram illustrating an example of the Probe message according to the embodiment of the present invention.

FIG. 20 is a diagram illustrating an example of the Probe message according to the embodiment of the present invention.

FIG. 22 is a diagram illustrating an example of the Probe message according to the embodiment of the present invention.

DESCRIPTION OF THE EMBODIMENTS

First Embodiment

Figure 1:
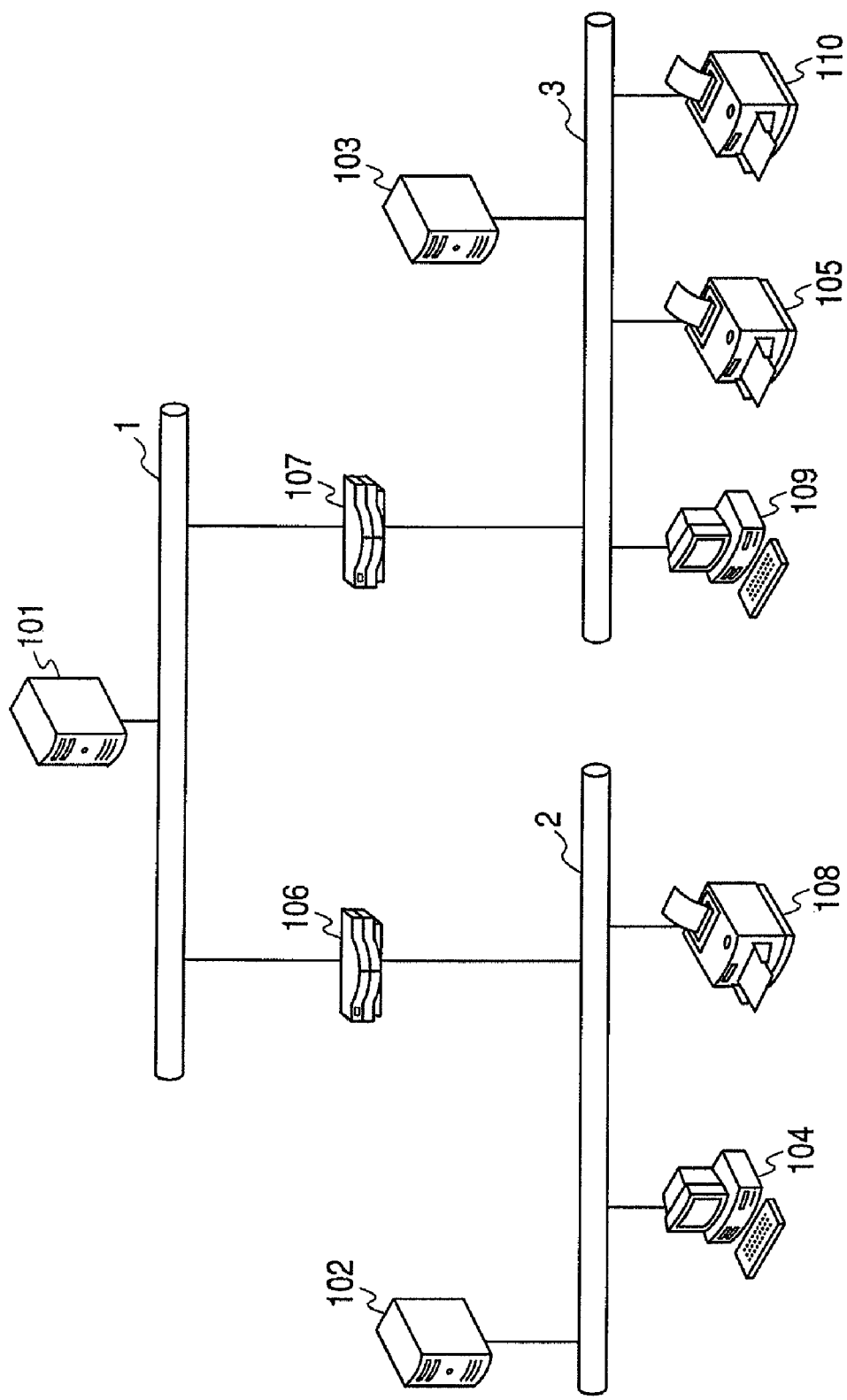
FIG. 1 is a diagram illustrating a configuration of a network device search system according to the embodiment of the present invention.

FIG. 1 is a diagram illustrating a configuration of a device search system to which the present invention is applied. Here, such a network system as illustrated in FIG. 1 includes three subnets 1, 2 and 3, each of the subnets 1, 2 and 3 includes a LAN (local area network), and each device connected on the network illustrated in FIG. 1 performs communication according to the TCP/IP (Transmission Control Protocol/Internet Protocol).

A DP (Discovery Proxy) 101 is connected to the subnet 1, and the IP address of the DP 101 is "192.168.2.10". A DP 102, a client PC 104 and an image forming apparatus 108 are connected to the subnet 2, the IP address of the DP 102 is "192.168.1.10", the IP address of the client PC 104 is "192.168.1.100", and the IP address of the image forming apparatus 108 is "192.168.1.1". A DP 103, a client PC 109 and image forming apparatuses 105 and 110 are connected to the subnet 3, the IP address of the DP 103 is "192.168.0.10", the IP address of the client PC 109 is "192.168.0.100", the IP address of the image forming apparatus 105 is "192.168.0.1", and the IP address of the image forming apparatus 110 is "192.168.0.2".

Further, the subnet 1 and the subnet 2 are mutually connected to each other via a router 106, and the subnet 1 and the subnet 3 are mutually connected to each other via a router 107. Thus, all the terminals connected to the subnets 1, 2 and 3 can mutually communicate resultingly. However, each of the routers 106 and 107 is set not to directly pass the data transmitted by broadcast or multicast from one subnet to the other subnet. Consequently, communication by broadcast and/or multicast can be performed only within each subnet.

Subsequently, in the configuration of the device search system illustrated in FIG. 1, the hardware and software constitutions of the DP 101, the DP 102, the DP 103, the client PCs 104 and 109, and the image forming apparatuses 105, 108 and 110 will be described hereinafter. Incidentally, it should be noted that, in the following description, the numeral 102 is used as the representative of the DPs, the numeral 104 is used as the representative of the client PCs, and the numeral 105 is used as the representative of the image forming apparatuses, unless otherwise noted.

Figure 2:
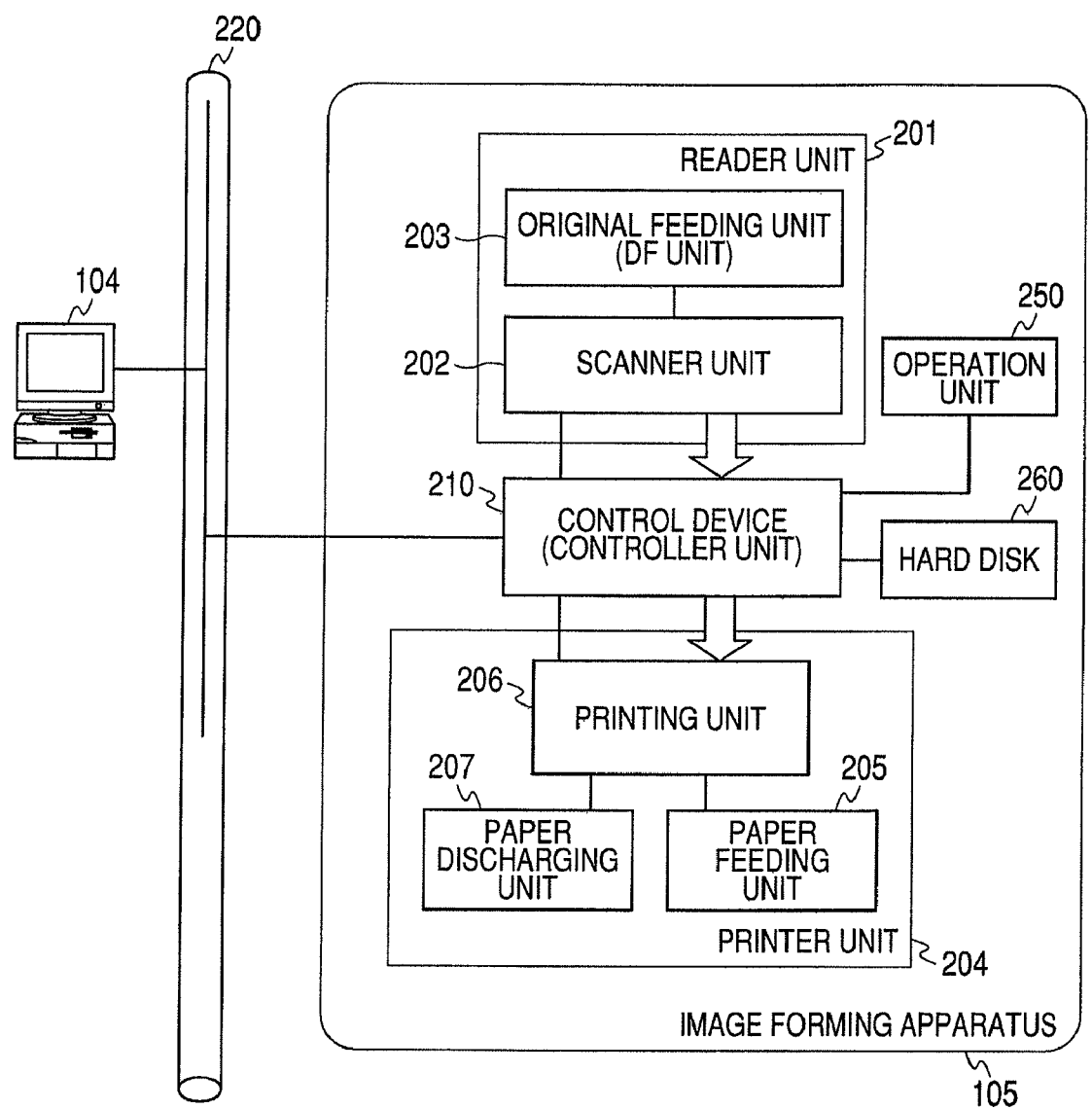
FIG. 2 is a block diagram illustrating a hardware constitution of an image forming apparatus according to the embodiment of the present invention.

FIG. 2 is a block diagram illustrating the hardware constitution of the image forming apparatus 105 according to the embodiment of the present invention.

In FIG. 2, a reader unit (image input apparatus) 200, which optically reads an original image and converts the read image into image data, includes a scanner unit 202 having a function for reading an original and an original feeding unit {DF (document feeding) unit} 203 having a function for feeding and transporting an original paper.

A printer unit (image output apparatus) 204 transports a recording paper, prints the image data as a visible image on the recording paper, and then discharges the recording paper on which the image has been printed outside the apparatus. The printer unit 204 includes a paper feeding unit 205 having plural kinds of recording paper cassettes, a printing unit 206 having a function to transfer the image data on the recording paper and then fix the transferred image data thereon, and a paper discharging unit 207 having a function to discharge the recording paper on which the image has been printed outside the apparatus after performing sorting and/or stapling.

A control device (controller unit) 210 is electrically connected to the reader unit 201 and the printer unit 204, and is also connected to client PC 104 through a network (LAN) 220. The control device 210 is equipped with a CPU (central processing unit), and the CPU controls the reader unit 201 and the printer unit 204 by executing a program stored in a storage unit such as a hard disk 260, a ROM (read only memory) or the like. As a result, the control device 210 provides several functions as described below. That is, the control device 210 provides a copy function to read the image data of the original by controlling the reader unit 201, store the image data in the hard disk 260, and output the image data to the recording paper by controlling the printer unit 204. Further, the control device 210 provides a scanner function to convert the image data read from the reader unit 201 into code data, and transmit the acquired code data to the client PC 104 through the network 220. Furthermore, the control device 210 provides a printer function to convert the code data (print data) received from the client PC 104 through the network 220 into image data, and output the acquired image data to the printer unit 204.

An operation unit 250, which is connected to the control device 210, includes a liquid crystal touch panel and the like, and provides a user I/F (interface) for operating an image input/output system.

Incidentally, the image forming apparatus 105 (device) illustrated in FIG. 2 is described by taking an MFP (multi function peripheral) having the printer function, the scanner function and the copy function for example. However, the image forming apparatus (device) in the present embodiment is not limited to the MFP. That is, the present invention is likewise applicable to an image forming apparatus such as a printer, a scanner, a copying machine, a facsimile machine or the like.

Figure 3:
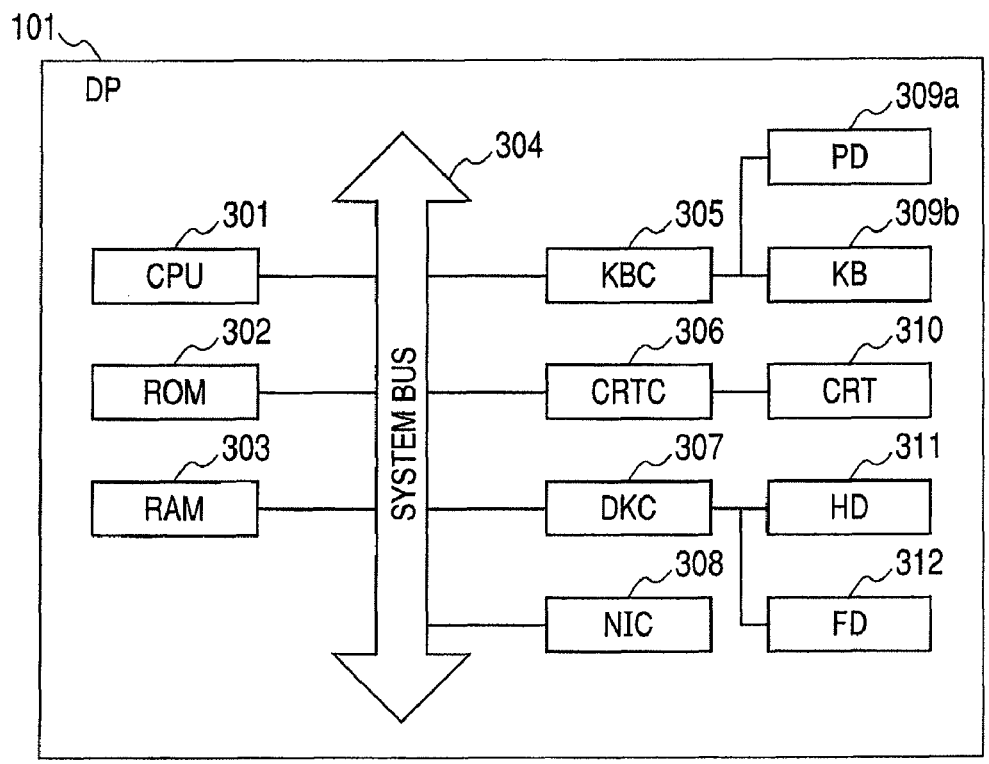
FIG. 3 is a block diagram illustrating a hardware constitution of a DP (Discovery Proxy) and a client PC (personal computer) according to the embodiment of the present invention.

FIG. 3 is a block diagram illustrating the hardware constitution of the DP 101 and the client PC 104. That is, it should be noted that general-purpose PCs (personal computers) can be used respectively as the DP 101 and the client PC 104, and the following description will be common to these PCs. Further, it should be noted that the DPs 102 and 103 have the same constitution.

In FIG. 3, a CPU 301 controls various devices which are connected to a system bus 304. A ROM 302 stores therein a BIOS (Basic Input/Output System) and a boot program, and a RAM (random access memory) 303 is used as a main memory for the CPU 301. A KBC (keyboard controller) 305 performs processes concerning inputting of information and the like from a PD (pointing device) 309a such as a mouse or the like and a KB (keyboard) 309b. A CRTC (cathode ray tube controller: display control unit) 306, which contains a video memory therein, performs drawing on the video memory according to an instruction from the CPU 301, and outputs image data drawn on the video memory to a CRT (cathode ray tube: display unit) 310 as a video signal. Incidentally, although the CRT is used as an example of the display unit in FIG. 3, other kinds of display units such as an LCD (liquid crystal display) unit and the like may be used. A DKC (disk controller) 307 accesses an HD (hard disk) 311 and an FD (floppy disk) 312. An NIC (network interface card) 308, which is connected to the network, performs information communication via the network. Incidentally, it should be noted that an OS (operating system), various application programs operating on the OS, and the like are stored in the HD 311.

In the above constitution, if the power supply of the hardware constitution itself is turned on, the CPU 301 reads the OS from the HD 311 to the RAM 303 according to the boot program stored in the ROM 302, whereby the hardware constitution resultingly functions as the information processing apparatus.

Figure 4:
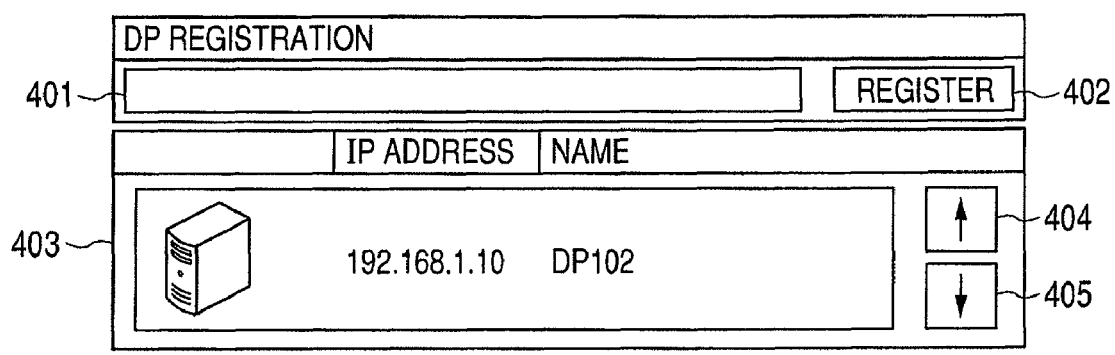
FIG. 4 is a diagram illustrating an example of the screen to be displayed on the displaying apparatus of the DP according to the embodiment of the present invention.

FIG. 4 is a diagram illustrating an example of the screen to be displayed on the displaying apparatus of the DP 103. It should be noted that, in the embodiment of the present invention, each DP has a function of transferring a search request received from the client PC to another DP. Here, the screen illustrated in FIG. 4 is the screen on which a user registers the DP of the transfer destination to which the DP 103 transfers the search request. That is, an IP address of the DP to be registered is input to an area 401. More specifically, a user inputs the IP address of the desired DP to the area 401 by using a keyboard or the like. Then, if a registration button 402 is depressed, the IP address input to the area 401 is registered as the IP address of the DP of the transfer destination to which the search request is transferred. The DP registered as above is displayed in an area 403. In an example illustrated in FIG. 4, the DP 102 has already been registered. In the area 403, the name and the IP address of the DP 102 and the icon indicating the DP 102 are displayed. However, information other than the name of the DP and the like may be displayed in the area 403.

Further, the user may register the plural DPs in regard to the DP 103 on the screen illustrated in FIG. 4. In this case, the plural DPs are displayed in the area 403. Here, buttons 404 and 405 are the buttons which can be depressed in the case where the plural DPs have been registered. If the button 404 indicated by the upward arrow is depressed in the state that any one of the plural DPs registered has been selected, the display order of the selected DP is moved upward by one. On the contrary, if the button 405 indicated by the downward arrow is depressed in the state that any one of the plural DPs registered has been selected, the display order of the selected DP is moved downward by one. In the case where the plural DPs have been registered in regard to the DP 103, the DP 103 determines the transfer order of the search requests according to the display order displayed in the area 403. That is, the search request is transferred from the superiorly displayed DP in due order.

Figure 5:
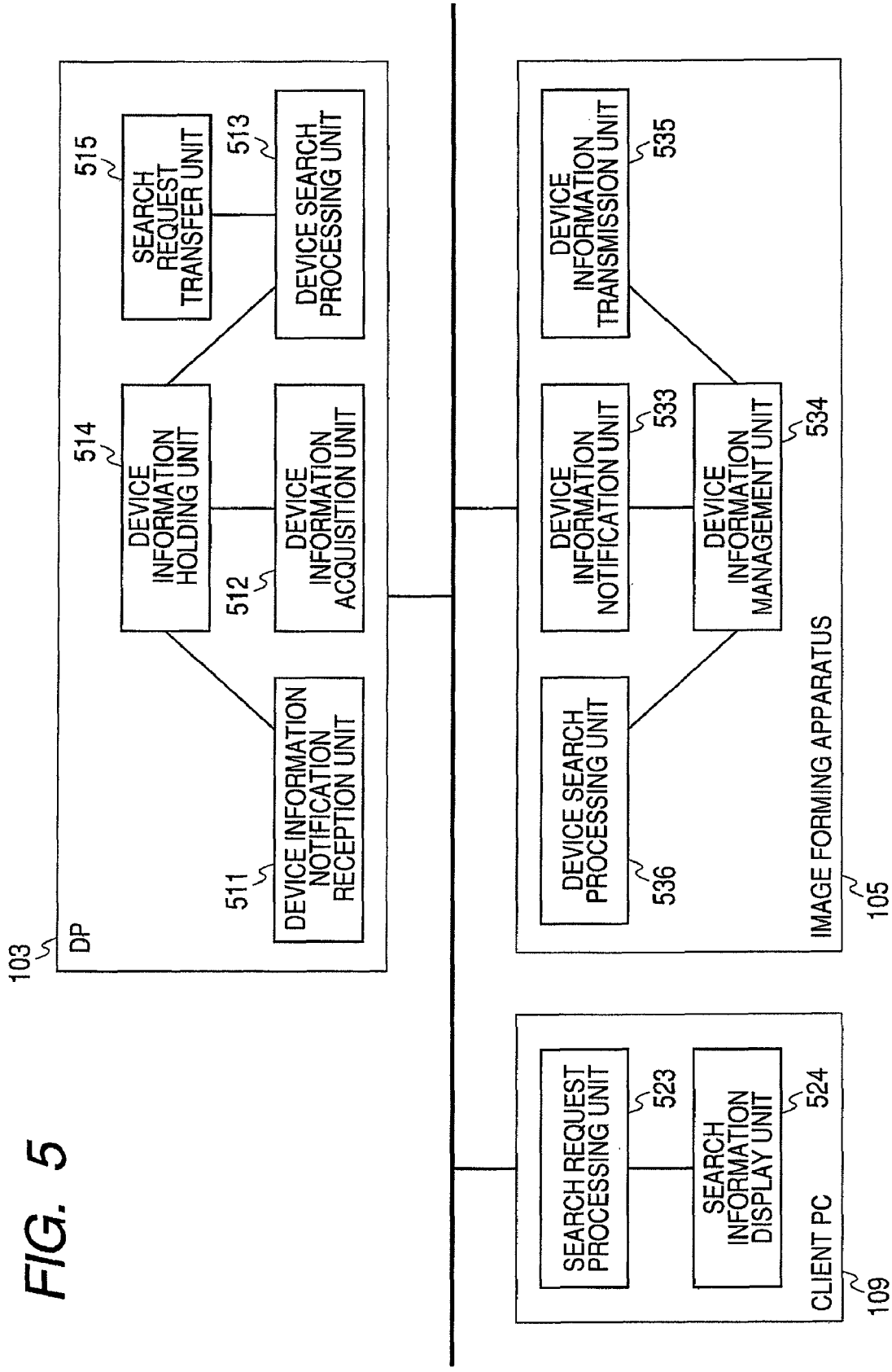
FIG. 5 is a block diagram illustrating software modules according to the embodiment of the present invention.

FIG. 5 is a block diagram illustrating software modules of the DP 103, the client PC 109 and the image forming apparatus 105. Here, it should be noted that each of the software modules is executed by the CPU provided in the corresponding apparatus.

In the DP 103, a device information notification reception unit 511 receives a Hello message or a Bye message transmitted from the image forming apparatus 105, and performs a process of the device information held by a device information holding unit 514 on the basis of the kind of received message. Incidentally, the details of the Hello message and the Bye message will be described later. For example, if the Hello message is received, the device information notification reception unit 511 judges that it is necessary to acquire the device information. In that case, a device information acquisition unit 512 transmits a device information acquisition request to the image forming apparatus 105 which transmitted the Hello message, and holds the replied device information in the device information holding unit 514. On the other hand, if the Bye message is received, the device information notification reception unit 511 judges that it is necessary to delete the device information held by the device information holding unit 514. In that case, the device information holding unit 514 deletes the device information of the image forming apparatus 105 which transmitted the Bye message.

Subsequently, a device search processing unit 513 receives the search request from the client PC 109 or another DP. The search request includes a search condition. Here, the device search processing unit 513 searches for the device information, which satisfies the search condition, in the device information held by the device information holding unit 514. Then, the device search processing unit 513 transmits a searched result to the client PC 109. Incidentally, the search request is transmitted from the client PC 109 by multicast. On the other hand, the search request is transmitted from another DP by unicast. Then, a search request transfer unit 515 partially rewrites the received search request, and transmits the rewritten search request to another DP. In any case, the detail of the device information held by the device information holding unit 514 will be described later.

In the client PC 109, a device search request processing unit 523 transmits the search request for searching for the device by multicast. After then, if the searched result transmitted from the DP is received, a search information display unit 524 displays the received searched result on the display.

In the image forming apparatus 105, a device information management unit 534 manages the device information of the image forming apparatus 105 itself. A device information notification unit 533 transmits the Hello message or the Bye message. If the device information acquisition request is received through the network, a device information transmission unit 535 transmits, to the transmission source of the device information acquisition request, the device information managed by the device information management unit 534. If the search request transmitted by multicast is received, a device search processing unit 536 transmits a reply concerning the search request.

FIG. 6 is a diagram illustrating an example of the device information to be held by the device information holding unit 514 of the DP 103. Here, the device information is stored in the storage unit such as the ROM 302, the HD 311 or the like provided in the DP 103. Further, FIG. 6 indicates a case where the device information of the image forming apparatus 105 and the device information of the image forming apparatus 110 are held by the device information holding unit 514 of the DP 103.

In FIG. 6, an ID (identifier) 601 indicates the ID for identifying the device information in the DP 103, a UUID (Universally Unique Identifier) 602 indicates the UUID for globally identifying the device, and a version 603 indicates the version of the device information. Further, a device type 604 indicates the type of device such as "MFP" which implies a multifunction peripheral, "Printer" which implies a printer, or the like. A model name 605 indicates the model name of the device such as "LBP XXXX" or the like. A device name 606 indicates the name which has been set to the device by a device manager (user), and a URL 607 indicates the URL for acquiring the device information.

Subsequently, the methods of registering the device information of the image forming apparatus 105 in the DP 103 will be described. Incidentally, the methods include a first method and a second method, and the first method will be described first.

In a case where the image forming apparatus 105 starts its operation or the device information thereof varies, the image forming apparatus 105 receives the Hello message as illustrated in FIG. 7. Although the Hello message is described by the XML (eXtensible Markup Language) in the present embodiment, it may be described by another markup language such as the HTML (HyperText Markup Language) or the like. This is also applicable to the following other messages described by the XML.

The Hello message illustrated in FIG. 7 includes a header section 701 enclosed by a <Header> tag and a body section 702 enclosed by a <Body> tag, and the whole of the Hello message is enclosed by an <Envelope> tag. Such a structure is common to all the massages to be used in the present embodiment.

The header section 701 acts as a common header which does not depend on the content of the message, and includes an <Action> tag, a <MessageID> tag and a <To> tag. Here, it should be noted that the <Action> tag is to identify the kind of message, the <MessageID> tag is to uniquely identify the message, and the <To> tag is to identify the transmission destination of the message. On the other hand, the structure of the body section 702 varies according to the content of the message. In FIG. 7, a <Hello> tag exists immediately below a <Body> tag, and the message of the <Hello> tag is the Hello message. Further, the <Hello> tag includes an <EndpointReference> tag, a <Types> tag, an <XAddrs> tag, and a <MetadataVersion> tag. Furthermore, the <EndpointReference> tag includes an <Address> tag which has the address information for identifying the device, the <Types> tag has the type information of the device, the <XAddrs> tag has the URL for acquiring the device information, and the <MetadataVersion> tag has the version of the device information.

The DP 103 extracts, from the received Hello message, the value of the <Address> tag in the <EndpointReference> tag as the UUID for globally identifying the device, extracts the value of the <Types> tag as the device type, extracts the value of the <MetadataVersion> tag as the version of the device information, and further extracts the value of the <XAddrs> tag as the URL for acquiring the device information. Then, the device information holding unit 514 stores the extracted values in the storage unit.

After then, the DP 103 transmits by unicast a Get message of XML format as illustrated in FIG. 8 to the URL described in the <XAddrs> tag. Here, it should be noted that the Get message as illustrated in FIG. 8 is the message which includes only the header section. More specifically, an <Action> tag in the header section indicates that the relevant message is the Get message.

If the Get message is received from the DP 103, the device information transmission unit 535 of the image forming apparatus 105 transmits a Get Response message of XML format as illustrated in FIG. 9. Thus, the further detailed device information of the image forming apparatus 105 is transmitted to the DP 103.

In the Get Response message illustrated in FIG. 9, the body section has the device information indicated by a <Metadata> tag. The <Metadata> tag includes Metadata Sections 901, 902 and 903 each of which is enclosed by a <MetadataSection> tag. Incidentally, a kind of information of each Metadata Section is designated by the tag immediately below the <MetadataSection> tag. More specifically, the Metadata Section 901 includes a <ThisDevice> tag in which the information different for each device is stored. Further, a <FriendlyName> tag indicates the name of the device, a <FirmwareVersion> tag indicates the firmware version of the device, and a <SerialNumber> tag indicates the serial number of the device. The Metadata Section 902 includes a <ThisModel> tag in which the information different for each model of the device is stored. Further, a <Manufacturer> tag indicates the manufacturer of the device, a <ManufacturerUrl> tag indicates the URL of the device manufacturer, a <PresentationUrl> tag indicates the URL of the information of the device, and a <ModelName> tag indicates the model name of the device. The Metadata Section 903 includes a <Relationship> tag in which the information concerning the internal service of the device is stored. In the present embodiment, the internal service implies a printing service which is provided by the image forming apparatus. The <Relationship> tag includes a <Hosted> tag immediately below, and the <Hosted> tag further includes a <EndpointReference> tag, a <Types> tag and a <ServiceId> tag. Further, the <EndpointReference> tag includes an <Address> tag having the address information for using the service. The <Types> tag has the type information of the service, and the <ServiceId> tag has the identifier for identifying the service.

The value of the <FriendlyName> tag and the value of the <ModelName> tag are extracted from the received Get Response message by the DP 103 respectively as the device name and the model name, and the extracted values are stored in the device information holding unit 514.

Incidentally, in a case where the image forming apparatus starts its operation or the setting information of the own apparatus varies, the image forming apparatus 105 transmits the Hello message to the DP 103. The DP 103 may acquire the device information as described above every time it receives the Hello message. However, if the previously acquired device information has existed in the device information holding unit 514, the DP 103 compares the version information of the Metadata Section included in the Hello message. Then, the DP 103 may not newly acquire the device information if the version information does not vary.

Subsequently, the second method will be described.

The client PC 103 transmits by multicast a Probe message of XML format as illustrated in FIG. 11 at predetermined timing. Here, it should be noted that the Probe message is an example of the search request in the present embodiment. In the Probe message illustrated in FIG. 11, a <Probe> tag is included in the body section so that the relevant message indicates the Probe message. Further, the <Probe> tag can include a <Types> tag which is to designate the type of the device that the user wishes to search for. That is, the information described in the <Types> tag is the search condition in the present embodiment. In FIG. 11, the <Types> tag is set to be vacant so as to target all the devices.

If the Probe message is received, the image forming apparatus 105 transmits a Probe Match message of XML format as illustrated in FIG. 12 to the DP 103. Here, it should be noted that the Probe Match message is an example of the information indicating the searched result in the present embodiment. In the Probe Match message illustrated in FIG. 12, a <ProbeMatches> tag is included in the body section so that the relevant message indicates the Probe Match message. Here, The Probe Match section indicated by a <ProbeMatch> tag is included in the <ProbeMatches> tag, and each of the Probe Match sections corresponds to one searched result. That is, it should be noted that the information included in the Probe Match section is the device information satisfying the search condition. For example, FIG. 12 indicates that one searched result is replied. Incidentally, it should be noted that the structure of the Probe Match section is the same as the structure of the content of the <Hello> tag in the Hello message illustrated in FIG. 7.

The DP 103 receives the Probe Match message. Then, the DP 103 extracts, from the received Probe Match message, the value of the <Address> tag in the <EndpointReference> tag as the UUID for globally identifying the device, extracts the value of the <Types> tag as the device type, extracts the value of the <MetadataVersion> tag as the version of the device information, and further extracts the value of the <XAddrs> tag as the URL for acquiring the device information. Subsequently, the device information holding unit 514 stores the extracted values in the storage unit.

After then, the DP 103 transmits by unicast the Get message of XML format as illustrated in FIG. 8 to the URL described in the <XAddrs> tag. The device information transmission unit 535 of the image forming apparatus 105 transmits the Get Response message as illustrated in FIG. 9. The DP 103 extracts the value of the <FriendlyName> tag as the name of the device, and the value of the <ModelName> tag as the model name of the device, from the received Get Response message. Then, the device information holding unit 514 stores the extracted values in the storage unit.

Incidentally, the DP 103 transmits the Probe message at predetermined timing, and then resultingly acquires the device information from the image forming apparatus 105. However, if the previously acquired device information has existed in the device information holding unit 514, the DP 103 compares the version information of the Metadata Section included in the Probe Match message. Then, the DP 103 may not newly acquire the device information if the version information does not vary.

Subsequently, a process in which the device information registered in the DP 103 is deleted by the image forming apparatus 105 will be described. If the image forming apparatus 105 stops providing the service to the client PC which exists on the network (for example, if the image forming apparatus 105 is shut down), the image forming apparatus 105 transmits by multicast a Bye message as illustrated in FIG. 10.

In the Bye message illustrated in FIG. 10, a <Bye> tag is included in the body section so that the relevant message indicates the Bye message. Further, the <Bye> tag includes an <EndpointReference> tag, and the <EndpointReference> tag further includes an <Address> tag having the address information for identifying the device. If the Bye message is received, the DP 103 extracts the UUID information included in the received Bye message, and the device information holding unit 514 deletes the device information corresponding to the extracted UUID information from the storage unit.

Subsequently, a process in which the client PC 109 searches for the image forming apparatus by using the DP 103 will be described.

The client PC 104 transmits by multicast a Probe message of XML format as illustrated in FIG. 14. Here, it should be noted that the Probe message is an example of the search request in the present embodiment. In the Probe message illustrated in FIG. 14, a <Probe> tag is included in the body section so that the relevant message indicates the Probe message. Further, the <Probe> tag includes a <Types> tag which is used to designate the type of the device that the user wishes to search for. That is, the information described in the <Types> tag indicates the search condition in the present embodiment. In FIG. 14, as an example of the search condition for searching the image forming apparatus, a Printer is designated in the <Types> tag. That is, the image forming apparatus of which the type of the device is the printer is searched as the device which satisfies the search condition.

If the Probe message is received by the DP 103, the <Types> tag is extracted to search for the device which matches the search condition from the device information held by the device information holding unit 514. Then, a Probe Match message of XML format as illustrated in FIG. 15 is transmitted to the client PC 109. In the Probe Match message illustrated in FIG. 15, a <ProbeMatches> tag is included in the body section so that the relevant message indicates the Probe Match message. Here, Probe Match sections 1501 and 1502 respectively indicated by <ProbeMatch> tags are included in the <ProbeMatches> tag, and each of the Probe Match sections corresponds to one searched result. For example, FIG. 15 indicates that the two searched results are replied. More specifically, FIG. 15 indicates that the two image forming apparatuses each of which satisfies the search condition "the type of device is the printer" have been searched. Incidentally, it should be noted that the structure of the Probe Match section is the same as the structure of the content of the <Hello> tag in the Hello message illustrated in FIG. 7.

After then, the DP 103 rewrites the received Probe message as illustrated in FIG. 16, and transmits by unicast the rewritten Probe message to the DP 102 registered by the registration method as described with reference to FIG. 4. Incidentally, it should be noted that the address of the client PC 109 of the transmission source which transmitted the Probe message to the DP 103 is set in a <ReplyTo> tag illustrated in FIG. 16.

If the Probe message is received from the DP 103, the DP 102 extracts the <Types> tag, searches for the device which matches the search condition from the device information held by the device information holding unit 514 of the DP 102, and generates the Probe Match message. Then, the DP 102 extracts the <ReplyTo> tag included in the Probe message received from the DP 103. Subsequently, the DP 102 transmits the generated Probe Match message to the client PC 109 which is the destination of the extracted <ReplyTo> tag.

As a result, it is possible for the client PC 109 to receive, from the DP 103, the searched result acquired by searching for the image forming apparatus existing in the subnet 3, and also to receive, from the DP 102, the searched result acquired by searching for the image forming apparatus existing in the subnet 2.

After then, according to need, it is possible for the client PC 109 to acquire the more detailed device information by transmitting a Get message to the searched image forming apparatus.

FIG. 13 is a diagram illustrating an example of a screen which is displayed on the display apparatus of the client PC 109. For example, the screen illustrated in FIG. 13 is displayed in a case where the client PC 109 searches for the image forming apparatus.

In FIG. 13, an area 1301 is the area which is used by the user to input the search condition. In the present embodiment, the area 1301 is used to designate a type of device to be searched. More specifically, key words such as "MFP", "Printer" and the like can be designated in the area 1301. In any case, the user may directly input the type of device by using the keyboard or the like. Alternatively, the user may select any one of predetermined candidates by displaying a pull-down menu. If any data is not input to the area 1301, all the image forming apparatuses are searched resultingly. Further, if a button 1302 is depressed to perform the search, the search request is transmitted. That is, the above-described Probe message is transmitted by multicast. Then, the searched result is displayed in an area 1303. More specifically, if the Probe Match message is received as the searched result, the types, the model names and the device names of the devices are simultaneously displayed. In any case, FIG. 13 indicates the example that the two image forming apparatuses have been searched.

Figure 17:
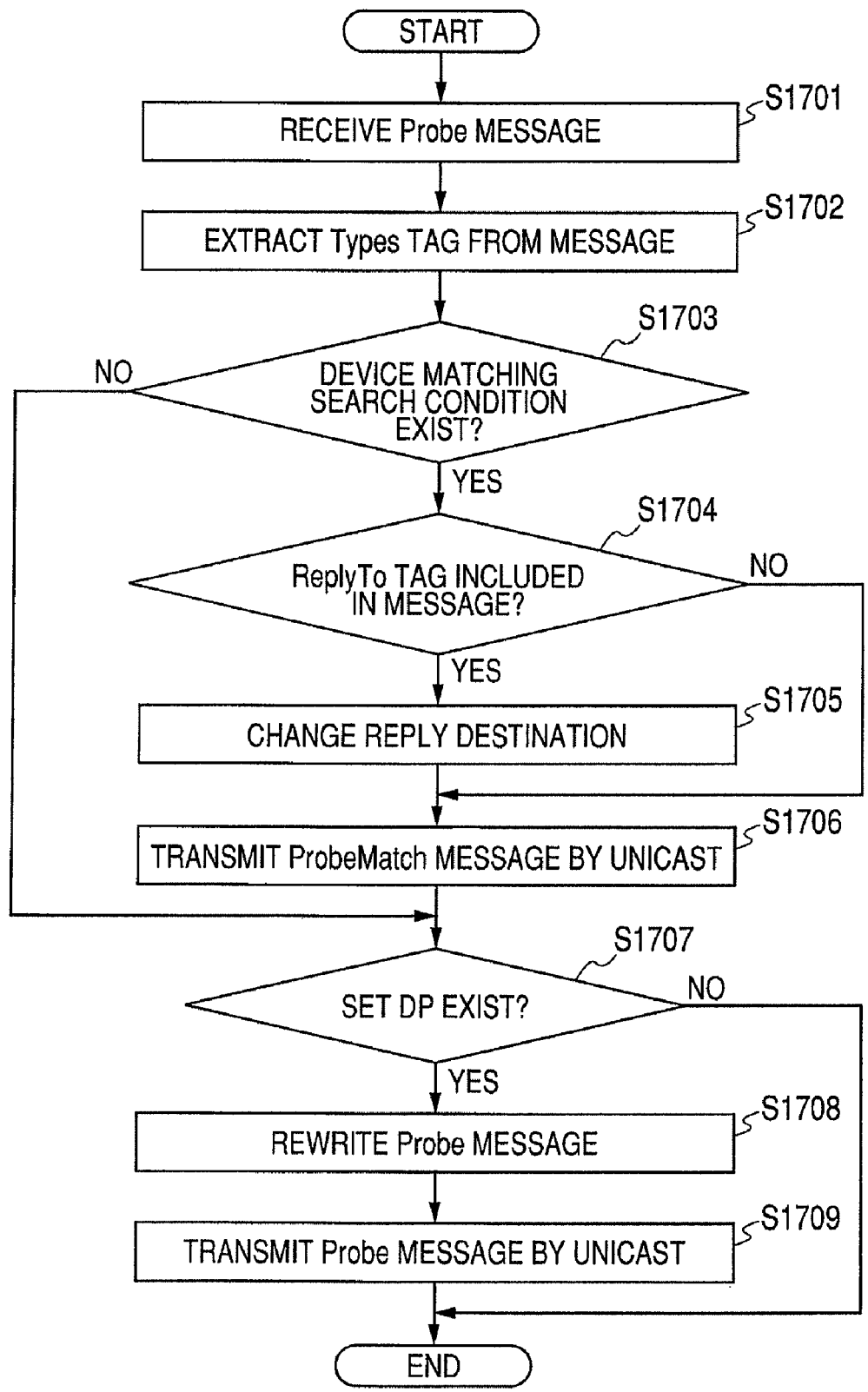
FIG. 17 is a flow chart illustrating a process of the DP according to the embodiment of the present invention.

Subsequently, the contents of the process to be performed by the DP in case of searching for the image forming apparatus will be described. FIG. 17 is a flow chart illustrating the process of searching for the image forming apparatus to be performed by the DP. Here, it should be noted that the process in the flow chart illustrated in FIG. 17 is performed in any of the DPs 101, 102 and 103. Further, it should be noted that the respective steps of the flow chart illustrated in FIG. 17 are processed if the CPU 301 of the DP executes the program stored in the ROM 302 or the HD 311.

In a step S1701, the Probe message transmitted through the network is received by the DP. In a step S1702, the <Types> tag included in the received Probe message is extracted by the device search processing unit 513. That is, the search condition included in the search request is extracted in this step. Then, in a step S1703, the device information satisfying the extracted search condition is searched by the device search processing unit 513 from the device information held by the device information holding unit 514. More specifically, it is judged in this step whether or not the device information including the information matching the information of the <Types> tag (that is, the information indicating the type of device) extracted in the step S1702 is included in the device information held by the device information holding unit 514. Here, if it is judged in the step S1703 that the device information matching the condition is included in the device information, the flow advances to a step S1704. On the other hand, if it is judged in the step S1703 that the device information matching the condition is not included in the device information, the flow advances to a step S1707. Incidentally, if the <Types> tag is not extracted, all the device information held by the device information holding unit 514 is considered as the device information matching the search condition.

In the step S1704, it is judged by the device search processing unit 513 whether or not the <ReplyTo> tag is included in the received Probe message. Here, if it is judged that the <ReplyTo> tag is included in the received Probe message, the flow advances to a step S1705. On the other hand, if it is judged that the <ReplyTo> tag is not included in the received Probe message, the flow advances to a step S1706. In the step S1705, the Probe Match message which is the reply to the Probe message is generated by the device search processing unit 513, and the device information which satisfies the search condition is included in the generated Probe Match message. Here, in the device search processing unit 513, the transmission destination to which the Probe Match message is transmitted is set not to the apparatus which is the transmission source of the Probe message but is set to the destination which has been described in the <ReplyTo> tag. In the step S1706, the generated Probe Match message is transmitted by unicast by the device search processing unit 513. Incidentally, if the destination is not set in the step S1705 (that is, if "NO" in the step S1704), the transmission source of the Probe Match message is the transmission source from which the Probe message was transmitted.

In the step S1707, it is judged by the device search processing unit 513 whether or not another DP has been registered as the transfer destination of the search request in the own apparatus. Here, it should be noted that another DP is registered in the method illustrated with reference to FIG. 4. If it is judged that another DP has been registered, the flow advances to a step S1708. On the other hand, if it is judged that another DP is not registered, the process ends.

In the step S1708, the Probe message to be transferred is generated by the search request transfer unit 515, so that the generated Probe message is transferred to another DP registered in the own apparatus. More specifically, the <ReplyTo> tag is added to the Probe message. Here, the address of the apparatus at the transmission source from which the Probe message is transmitted (that is, the client PC in this case) is set to the <ReplyTo> tag. Incidentally, if the <ReplyTo> tag has already been included in the Probe message, the Probe message to be transferred is not newly generated. In a step S1709, the generated Probe message to be transferred (or the Probe message received in the step S1701) is transmitted by unicast from the search request transfer unit 515 to another DP registered. If plural other DPs have been registered, the Probe message is transmitted respectively to the plural other DPs.

Subsequently, the condition in the case where the search request is transferred to another DP by the search request transfer unit 515 of the DP will be described.

In the flow chart illustrated in FIG. 17, if another DP being the transfer destination of the search request has been registered to the DP, the search request is unconditionally transferred to another DP registered. For this reason, if further another DP being the transfer destination has been registered to another DP being the transfer destination, the search request keeps being transferred continuously. As a result, there is a possibility that one search request keeps being continuously transferred without limitation.

To prevent such a situation, in the present embodiment, the condition which is necessary in a case where the search request transfer unit 515 of the DP transfers the search request to another DP is set to the search request transfer unit 515. Hereinafter, several methods of setting the above condition will be concretely described.

A first method by which the search request transfer unit 515 of the DP transfers the search request to another DP is the method of transferring the search request to only the DP which exists in a hierarchy upper than (or a hierarchy lower than) a hierarchy of the subnet to which the DP which received the search request exists.

The system according to the present embodiment consists of the plural subnets as illustrated in FIG. 1. In the first method, it is assumed that a hierarchical structure is set to each of the plural subnets. More specifically, it is assumed that, in FIG. 1, the subnet 1 is set as the upper-hierarchy subnet of the subnet 2, the subnet 1 is set as the upper-hierarchy subnet of the subnet 3, and the subnet 2 and the subnet 3 are set as the same-hierarchy subnets. Then, such hierarchy relation of the plural subnets has been previously registered in the DP which exists in each subnet.

Hereinafter, the first method will be described with reference to FIG. 1 in which the above hierarchy relation has been registered. First, the Probe message is transmitted by multicast by the client PC 109. FIG. 18 is a diagram illustrating an example of the Probe message which is transmitted by the client PC 109. In FIG. 18, a <Conditions> tag is included in the Probe message, and "UpperLayer" is designated in the <Conditions> tag. Here, it should be noted that the <Conditions> tag indicates the transfer condition in the case where the Probe message is transferred by the search request transfer unit. Further, in FIG. 18, it is designated that the Probe message is transferred to only the DP which exists in the upper hierarchy.

If the Probe message illustrated in FIG. 18 is received by the DP 103, the search request transfer unit 515 of the DP 103 refers to the <Conditions> tag and thus recognizes that the Probe message should be transmitted to the subnet of the hierarchy upper than that of the subnet in which the own apparatus exists. Then, the search request transfer unit 515 of the DP 103 recognizes that the subnet of the hierarchy upper than that of the subnet in which the own apparatus exists is the subnet 1, by referring to the information previously set in the search request transfer unit 515. Then, the DP which exists in the subnet 1 which is the upper-hierarchy subnet is extracted from among the DPs previously registered as the DPs at the transfer destinations, according to the method illustrated with reference to FIG. 4. For example, if the DP 101 and the DP 102 have been registered, the DP 101 which exists in the subnet 1 is extracted. Then, the Probe message is transferred from the search request transfer unit 515 of the DP 103 to the DP 101 in the subnet 1. At this time, as described in the step S1708 illustrated in FIG. 17, the Probe message to be transferred, in which the IP address "192.168.0.100" of the client PC 109 has been set to the <ReplyTo> tag, is generated by the search request transfer unit 515, and the generated Probe message is transmitted.

As described above, according to the first method, it is possible to prevent that the Probe message transmitted from the client PC keeps being continuously transferred to the DP without limitation.

A second method by which the search request transfer unit 515 of the DP transfers the search request to another DP is the method of transferring the search request according to the designated number of times.

Hereinafter, a concrete example of the second method will be described based on the system illustrated in FIG. 1. That is, a Probe message illustrated in FIG. 19 is transmitted by multicast by the client PC 109, a <Tt1> tag is included in the Probe message in FIG. 19, and "1" is designated in the <Tt1> tag. Here, it should be noted that the <Tt1> tag is equivalent to the value indicating a limiting value of number of times that the Probe message is transferred. That is, if the <Tt1> tag is "1", it indicates that the Probe message can be transferred only once. Further, if the <Tt1> tag is "10", it indicates that the Probe message can be transferred ten times. In other words, in the system in which one DP exists in one subnet, the Probe message in which "1" is designated to the <Tt1> tag is maximally transmitted to the two DPs.

If the Probe message illustrated in FIG. 19 is received by the DP 103, the search request transfer unit of the DP 103 refers to the <Tt1> tag included in the Probe message received and thus recognizes that the <Tt1> tag is "1". Then, it is judged whether or not another DP at the transfer destination has been registered. If another DP at the transfer destination has been registered, the search request transfer unit 515 generates the Probe message to be transferred. FIG. 20 is a diagram illustrating an example of the Probe message to be transferred, generated by the search request transfer unit 515. Here, it should be noted that the Probe message illustrated in FIG. 20 is different from the Probe message illustrated in FIG. 19 in the following points. That is, first, the <ReplyTo> tag to which the IP address "192.168.0.100" of the client PC 109 being the transmission source of the Probe message has been set is added. Further, the value of the <Tt1> tag is set to "0". That is, the search request transfer unit 515 sets, as the value of the <Tt1> tag, the value obtained by subtracting "1" from the value of the <Tt1> tag of the Probe message received. Incidentally, in a case where the DPs of the plural transfer destinations have been registered in the DP 103 and the Probe message is transferred to the DPs of the plural transfer destinations, the value of the <Ttl> tag is subtracted by the number which is equivalent to the number of the plural transfer destinations. Further, in a case where the value of the <Ttl> tag of the received Probe message is "1" although the DPs of the plural transfer destinations have been registered, the DP of the one transfer destination which has highest priority is selected, and the Probe message is transferred only to the selected DP. Here, it should be noted that the priority can be determined according to the registration order as described with reference to FIG. 4.

The generated Probe message to be transferred is transmitted to another DP by the search request transfer unit 515 of the DP 103. After then, if the DP which received the transferred Probe message recognizes that the value of the <Ttl> tag included in the Probe message is "0", the relevant DP is controlled not to transfer the Probe message after that.

As described above, according to the second method, it is possible to prevent that the Probe message transmitted from the client PC keeps being continuously transferred to the DP without limitation. In addition, it is possible to designate, in the Probe message, to how many DPs the Probe message should be transferred.

Incidentally, the value of the <Ttl> tag is counted as the number of the DPs in the second method, the present invention is not limited to this. That is, the value of the <Ttl> tag may be counted as the number of the subnets. In other words, the value of the <Ttl> tag may be calculated by counting the number of the routers through which the Probe message transmitted passes, and subtracting the counted value from the value of the <Ttl> tag.

A third method by which the search request transfer unit 515 of the DP transfers the search request to another DP is the method of notifying the DP to which the search request has already been transferred and transferring the search request only to the DP to which the search request is not yet transferred.

Figure 21:
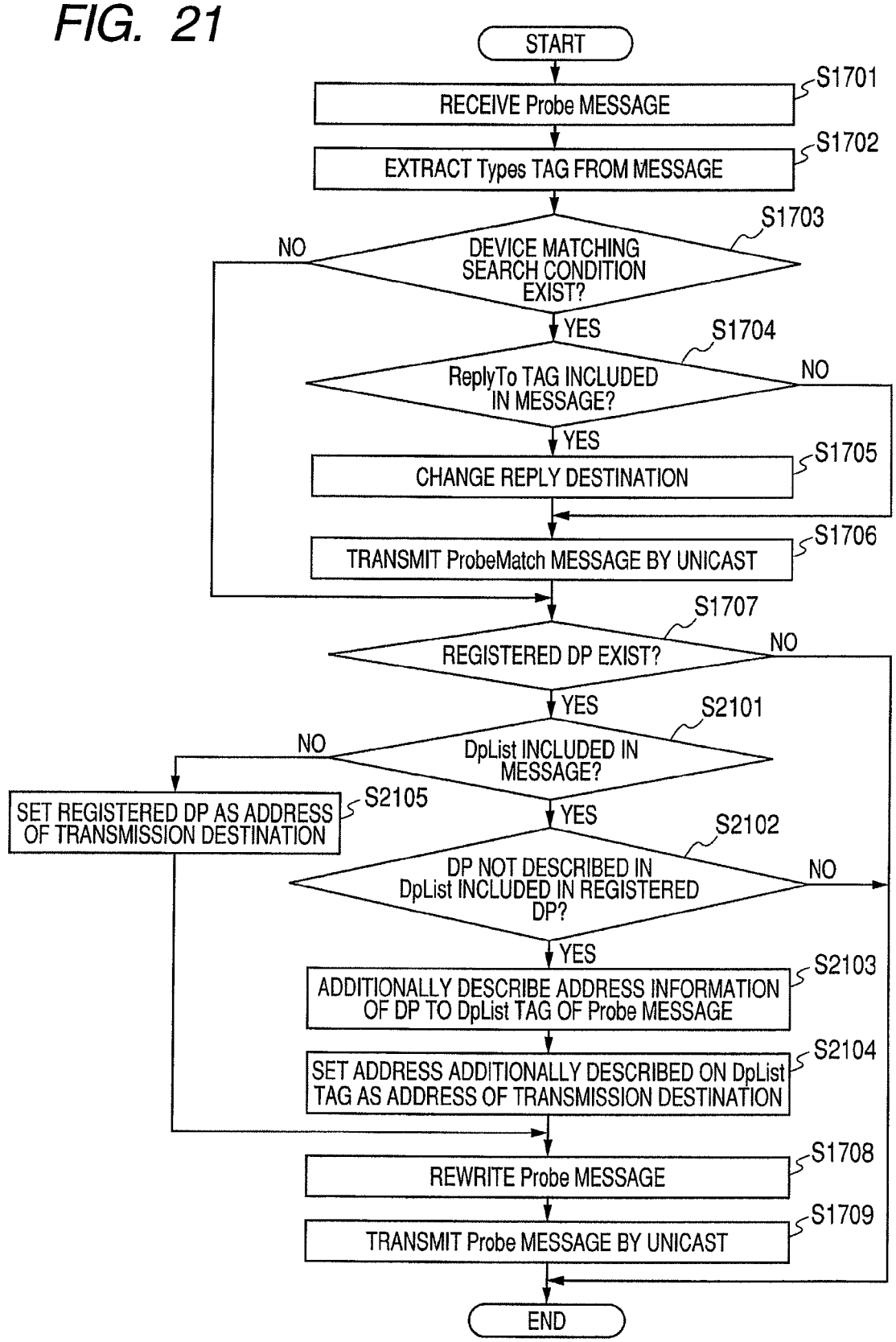
FIG. 21 is a flow chart illustrating a process of the DP according to the embodiment of the present invention.

Hereinafter, a concrete example of the third method will be described with reference to a flow chart illustrated in FIG. 21. That is, FIG. 21 is the flow chart illustrating the operation of the DP which receives the Probe message from the client PC. In FIG. 21, the processes same as those in FIG. 17 are respectively indicated by the numerals same as those in FIG. 17, and the detailed descriptions of these processes will be omitted.

The flow chart illustrated in FIG. 21 is the flow chart which indicates the process of the DP 102 in the system illustrated in FIG. 1. Incidentally, FIG. 21 indicates an example that the Probe message transmitted from the client PC 109 illustrated in FIG. 1 is transferred by the DP 103 and the transferred Probe message is received by the DP 102. Besides, FIG. 22 is a diagram illustrating an example of the Probe message received by the DP 102. Here, it is assumed that the DP 102 (192.168.1.10) has been registered in the DP 103 as the DP of the transfer destination, and it is also assumed that the DP 101 (192.168.2.10) and the DP 103 (192.168.0.10) have been registered in the DP 102 as the DPs of the transfer destinations. Further, it should be noted that the DP of the transfer destination is registered in the above-described method illustrated with reference to FIG. 4.

A <DpList> tag is included in the Probe message illustrated in FIG. 22, and the <DpList> tag indicates the DP to which the Probe message has already been transmitted. In the present embodiment, since the Probe message has already been transmitted to the DP 103 and the DP 102, the respective IP addresses of these DPs are described in the Probe message in FIG. 22.

In the step S1701, the Probe message illustrated in FIG. 22, which was transmitted from the DP 103, is received by the DP 102. Here, in FIG. 22, since the processes in steps S1702 to S1707 are the same as those already described with reference to FIG. 17, the descriptions of these steps will be omitted.

In a step S2101, it is judged by the search request transfer unit 515 of the DP 102 whether or not the <DpList> tag is included in the Probe message received. If it is judged that the <DpList> tag is included in the Probe message received, the flow advances to a step S2102. On the other hand, if it is judged that the <DpList> tag is not included in the Probe message received, the flow advances to a step S2105. In the step S2102, it is judged by the search request transfer unit 515 whether or not a DP which is not described in the <DpList> tag is included in the DPs which have been registered as the DPs of the transfer destinations. In the present embodiment, the DP 101 (192.168.2.10) and the DP 103 (192.168.0.10) have been registered in the DP 102 as the DPs of the transfer destinations. On the other hand, the DP 102 (192.168.1.10) and the DP 103 (192.168.0.10) have been described in the <DpList> tag of the Probe message registered. Then, if these DPs are compared, it is apparent that the DP 101 is not described in the <DpList> tag.

In a step S2103, the DP which is not described in the <DpList> tag is extracted by the search request transfer unit 515 from among the DPs which have been registered as the DPs of the transfer destinations, and the IP address of the extracted DP is described in the <DpList> tag. In the example illustrated in FIG. 21, the IP address (192.168.2.10) of the DP 101 which is not described in the <DpList> tag is additionally described in the <DpList> tag by the DP 102. Then, in a step S2104, the IP address additionally described in the <DpList> tag in the step S2103 is set by the search request transfer unit 515 as the IP address of the transmission destination to which the Probe message is transmitted. In the example illustrated in FIG. 21, the IP address (192.168.2.10) of the DP 101 is set as the IP address of the transmission destination to which the Probe message is transmitted.

The process in a step S1708 is the same as that in the step S1708 illustrated in FIG. 17. That is, if the <ReplyTo> tag is not included in the Probe message received, the <ReplyTo> tag is added to the Probe message, and the IP address of the client PC at the transmission source from which the Probe message is transmitted is described in the <ReplyTo> tag. Here, if the <ReplyTo> tag has already existed as illustrated in FIG. 22, the process in the step S1708 is omitted. Then, in a step S1709, the Probe message generated is transmitted by the search request transfer unit 515.

Further, the process in the step S2105 is the process to be performed in the case where the <DpList> tag is not included in the Probe message received. That is, in the step S2105, another DP previously registered as the DP of the transfer destination is set by the search request transfer unit 515 as the IP address of the transmission destination to which the Probe message is transmitted.

Incidentally, in the step S2102, it is simultaneously judged by the search request transfer unit 515 whether or not the own IP address has been described in the <DpList> tag. In the example illustrated in FIG. 21, the own IP address (192.168.1.10) has been described in the <DpList> tag. In that case, the own IP address is not described in the <DpList> tag anew. However, if the own IP address is not described in the <DpList> tag, the own IP address is described in the <DpList> tag by the search request transfer unit 515 in the step S2103.

As described above, according to the third method, it is possible to prevent that the Probe message transmitted from the client PC keeps being continuously transferred to the DP without limitation. In addition, it is possible to prevent that the same Probe message is redundantly transmitted to the same DP.

As another method, a method of determining whether or not to transfer the Probe message on the basis of the IP address of the client PC at the transmission source of the Probe message is conceivable. For example, in the system illustrated in FIG. 1, an environment in which a VLAN (virtual local area network) of setting a virtual group according to IP addresses is conceivable. In the environment like this, for example, in a case where the network is divided by providing the VLAN for each department and accessing is limited for each VLAN, it is necessary to control so as not to allow searching from the client PC which belongs to another VLAN.

Consequently, in the case where the DP transfers the search request to the DP in another subnet, the DP is controlled, on the basis of the IP address of the client PC, to transfer the search request to the DP which belongs to the same VLAN and not to transfer the search request to the DP which does not belong to the same VLAN. Further, the DP can be also controlled to enable to transfer the DP in another subnet only in response to the search request from the client PC which belongs to a specific VLAN.

Incidentally, unit of the group which is set by the VLAN can be properly determined. For example, the group of the VLAN can be set for each department in an office, each building, each floor in a building, or the like.

Further, in a case where plural other DPs have been registered as the transfer destinations of the search request, it is possible to control the order of transferring the search request. For example, it is assumed that a DP-X in which three DPs of DP-A, DP-B and DP-C have been registered as the DPs of the transfer destinations of the search request in this order exists. In this case, the DP-X is controlled to transfer the transfer request to the DP-A firstly, to the DP-B secondly and to the DP-C finally according to the registration order of the transfer destination DPs. However, in such control, in a case where the DP-C further has transfer destination DPs and the number of the relevant transfer destination DPs is large, many transfer requests are generated at the DP-C, whereby it takes a long time for the client PC to obtain all the searched results. Consequently, to cope with such a situation, it enables to change the registration order of the transfer destination DPs. Thus, if the registration order of the DP having many transfer destination DPs is changed superiorly, it becomes possible to bring the transfer order forward and thus obtain the reply concerning the searched results as earlier as possible.

Other Embodiments

In the above-described embodiment, the image forming apparatus and the information processing apparatus acting as the DP are described respectively as separate apparatuses. However, the image forming apparatus and the information processing apparatus acting as the DP may be provided as a single apparatus. For example, in FIG. 1, the image forming apparatus 108 may have the function of the DP 102. Likewise, the client PC may have the function of the DP in the above-described embodiment. Besides, the image forming apparatus and the client PC in the above-described embodiment may be provided as a single apparatus.

Further, in the present invention, the storage medium storing the computer program codes of software for achieving the functions of the flow charts of the above-described embodiment may be supplied to a system or an apparatus. Thus, the present invention can be achieved, if a computer {CPU or MPU (microprocessor unit)} in the system or the apparatus reads and executes the program codes stored in the storage medium.

In this case, since the program codes themselves read from the storage medium achieve the functions of the above-described embodiment, the storage medium storing these program codes constitutes the present invention.

As the storage medium for supplying the program codes, for example, a flexible disk, a hard disk, an optical disk, a magnetooptical disk, a CR-ROM (compact disk read only memory), a CD-R (compact disk Recordable), a DVD-ROM (digital versatile disk read only memory), a magnetic tape, a nonvolatile memory card, a ROM (read only memory) or the like can be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-141056 filed May 29, 2008, which is hereby incorporated by reference herein.

What is claimed is:

1. A search apparatus which searches for a device, comprising:
at least a processor and memory, functioning as:
a reception unit adapted to receive a search request including a search condition and information indicating at least one other search apparatus to which the search request was already transferred by another apparatus;
a search unit adapted to search for the device satisfying the search condition included in the search request received by said reception unit;
a judgment unit adapted to judge whether or not information indicating a transmission destination of the search result is included in the search request received by said reception unit;
a transmission unit adapted to transmit a search result including information of the device searched for by said search unit; a transfer unit adapted to transfer the search request to a second search apparatus; a registering unit adapted to register a plurality of other search apparatuses as destinations to which the search request is transferred; and
a specifying unit adapted to specify, from the plurality of other search apparatuses registered by said registering unit, at least one other search apparatus to which the search request was already transferred by another apparatus,
wherein,
in a case where it is judged by said judgment unit that the information indicating the transmission destination is included in the search request, said transmission unit transmits the search result to the transmission destination, and
in a case where it is judged by said judgment unit that the information indicating the transmission destination is not included in the search request, said transmission unit transmits the search result to a client apparatus that is an original source of the search request, and
wherein said transfer unit transfers the search request to, in the plurality of other search apparatuses registered by said registering unit, at least one other search apparatus other than the at least one other search apparatus specified by said specifying unit.

2. A search apparatus according to claim 1, wherein
the search apparatus is connected to a network which is constituted by plural subnets,
the client apparatus and the search apparatus are connected to a first subnet of the plural subnets, and
one of a plurality of other search apparatuses is connected to a second subnet of the plural subnets different from the first subnet.

3. A search apparatus according to claim 1, wherein
the search apparatus is connected to a network which has a hierarchical structure, and
one of a plurality of other search apparatuses is connected to a higher sub-hierarchy in the hierarchical structure than the search apparatus is.

4. A search apparatus according to claim 1, wherein
the search request includes information indicating a limiting value on a number of times that the search request is transferred, and
said transfer unit transfers the search request according to the information indicating the limiting value.

5. A control method for a search apparatus which searches for a device, the control method comprising the steps of:
receiving a search request including a search condition and information indicating at least one other search apparatus to which the search request was already transferred by another apparatus;
searching for the device satisfying the search condition included in the search request received in said receiving step;
judging whether or not information indicating a transmission destination of the search result is included in the search request received in said receiving step;
transmitting a search result including information of the device searched for in said searching step;
transferring the search request to a second search apparatus;
registering a plurality of other search apparatuses as destinations to which the search request is transferred; and
specifying, from the plurality of other search apparatuses registered in said registering step, at least one other search apparatus to which the search request was already transferred by another apparatus,
wherein,
in a case where it is judged in said judging step that the information indicating the transmission destination is included in the search request, the search result is transmitted to the transmission destination in said transmitting step, and
in a case where it is judged in said judging step that the information indicating the transmission destination is not included in the search request, the search result is transmitted to a client apparatus that is an original source of the search request,
wherein in said transfer step, the search request is transferred to, in the plurality of other search apparatuses registered in said registering step, at least one other search apparatus other than the at least one other search apparatus specified in said specifying step, and
wherein at least some of said steps are performed using a computer.

6. A non-transitory computer-readable storage medium storing a computer program for causing a search apparatus which searches for a device to execute the following steps of:
receiving a search request including a search condition and information indicating at least one other search apparatus to which the search request was already transferred by another apparatus;
searching for the device satisfying the search condition included in the search request received in said receiving step;
judging whether or not information indicating a transmission destination of the search result is included in the search request received in said receiving step;
transmitting a search result including information of the device searched for in said searching step;
transferring the resulting search request to a second search apparatus;
registering a plurality of other search apparatuses as destinations to which the search request is transferred; and
specifying, from the plurality of other search apparatuses registered in said registering step, at least one other search apparatus to which the search request was already transferred by another apparatus,
wherein,
in a case where it is judged in said judging step that the information indicating the transmission destination is included in the search request, the search result is transmitted to the transmission destination in said transmitting step, and
in a case where it is judged in said judging step that the information indicating the transmission destination is not included in the search request, the search result is transmitted to a client apparatus that is an original source of the search request, and
wherein in said transfer step, the search request is transferred to, in the plurality of other search apparatuses registered in said registering step, at least one other search apparatus other than the at least one other search apparatus specified in said specifying step.

* * * * *